Dec. 18, 1934.    L. J. R. HASSELBERG    1,984,581
APPARATUS FOR COOLING AND AERATING MILK
Filed June 8, 1934    2 Sheets-Sheet 2

Inventor

Linus J. R. Hasselberg by atty.

Patented Dec. 18, 1934

1,984,581

UNITED STATES PATENT OFFICE 1,984,581

APPARATUS FOR COOLING AND AERATING MILK

Linus Johan Reinhold Hasselberg, Krapperup, Sweden

Application June 8, 1934, Serial No. 729,695
In Sweden June 9, 1933

3 Claims. (Cl. 257—74)

It is desirable that milk should be cooled and aerated immediately after milking. To this end several forms of apparatus have been proposed for cooling and aerating milk in standard milk cans. It is desirable that the milk can be cooled by such an apparatus in a short time to a temperature exceeding with a few degrees only the temperature of the well water which is used for this cooling. Further it is desirable that the cooling and aerating apparatus is of a simple, cheap and durable construction and is easy to handle and make clean.

The present invention has for its object to provide a cooling and aerating apparatus for milk in standard milk cans, by which the demands referred to above will be satisfied in the highest degree. The apparatus is of the type which can be applied on any standard milk can and is provided with a rotary stirrer adapted to be placed within the milk in the milk can. Further the apparatus is of the type in which the stirrer hangs down from a holder adapted to rest on the top of the milk can and in which the cooling water flows through the rotary stirrer and is then distributed over the outer walls of the milk can so that the milk is subjected to the cooling action of the cooling water firstly when the cooling water flows through the stirrer within the milk in the can and secondly when the cooling water flows down on the outer walls of the can. While in known forms of milk cooling and aerating apparatus of this kind the rotary stirrer is provided with a water wheel and is driven by directing a jet of the cooling water against such water wheel, according to the present invention the cooling water flowing through the stirrer leaves the stirrer through reaction turbine nozzles thereon so that the rotary stirrer is driven by the cooling water according to the reaction turbine principle through the outflow of the cooling water through said nozzles. This results in a much more simple, practical and efficient construction of the milk cooling and aerating apparatus.

It is known per se in connection with apparatus of another kind and for another purpose to make use of a cooling fluid flowing through a rotary stirrer for driving the stirrer according to the reaction turbine principle through the outflow of said fluid through reaction turbine nozzles on the stirrer.

Figure 1:
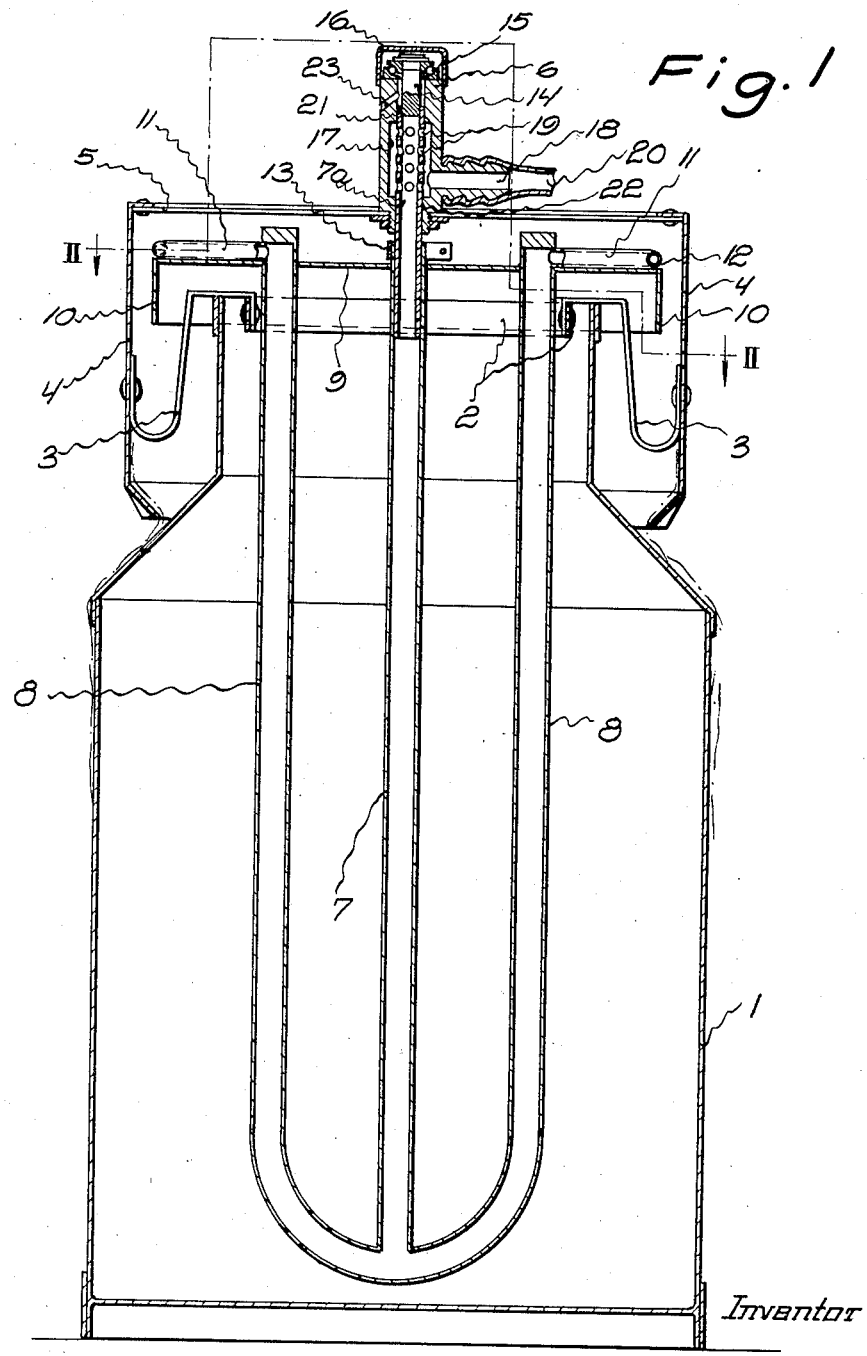
Figure 2:
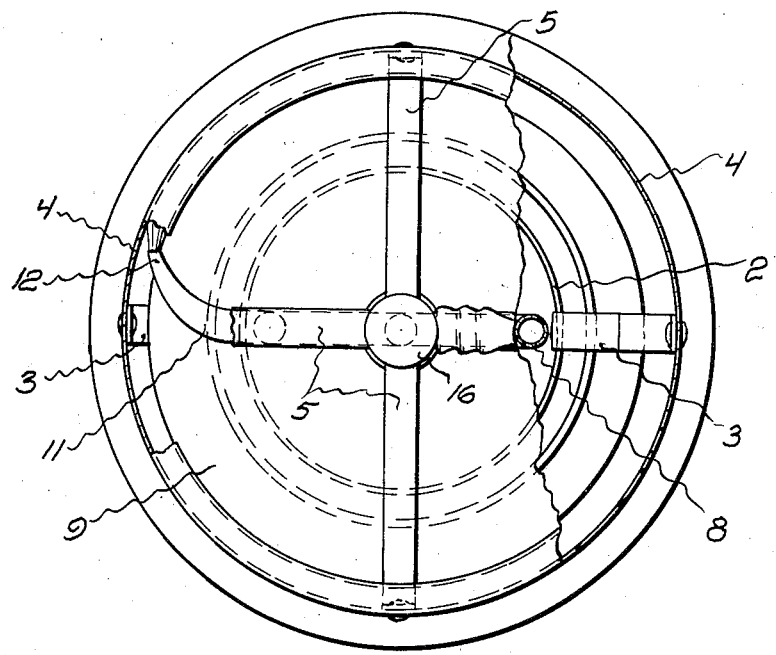

The invention will now be more fully described with reference to the accompanying drawings in which Fig. 1 is a vertical section of the milk cooling and aerating apparatus as applied on a standard milk can for cooling and aerating the milk therein, and Fig. 2 is a plan view, partly in section on line II—II in Fig. 1.

The holder adapted to be applied on the top of the milk can 1 consists of a ring 2 lying within the edge of the mouth of the can and connected by means of bent straps 3 with a surrounding, annular guard plate or mantle 4 which at its upper end is provided with crossed bars 5 carrying a centrally arranged journal sleeve 6. The stirrer which is journaled in the sleeve 6 and hangs freely down in the milk can consist of a central tube 7 and a pair of tubes 8 disposed on opposite sides of the central tube 7 and connected with the latter at the lower ends of the tubes. The central tube 7 is provided at its upper end with an extension sleeve 7a journaled in the sleeve 6. The upper ends of all the tubes 7, 8 penetrate a guard or cover plate 9 which is secured to the tubes 7, 8 and has its outer edge turned downward as shown at 10. On the upper side of the plate 9 the tubes 8 are provided with outwardly projecting extensions 11 having tangentially disposed outlet ends forming reaction turbine nozzles 12. The extension sleeve 7a is inserted in the upper end of the central tube 7 and is detachably secured thereto by means of a screw clamp 13. The extension sleeve 7a is closed at its upper end and provided with a projecting stud 14 which is journaled by means of a thrust ball bearing 15 at the upper end of the sleeve 6, and a cap 16 is provided over the said ball bearing at the upper end of the sleeve 6. The bore in the journal sleeve is provided with an enlargement 17, and an inlet stud 18 opens into said enlargement at which the extension sleeve 7a is provided with a number of inlet holes 19 in its wall. The cooling water is supplied to the inlet 18 by means of a hose 20 or the like under a pressure of for instance a water column of 1 meter.

When using the apparatus the holder is applied on the top of the milk can containing the milk to be cooled and aerated as shown in Fig. 1, and the cooling water is supplied through the hose 20. The cooling water then flows firstly down through the central tube 7 and then upwards through the tubes 8 and flows out through the reaction turbine nozzles 12, whereby the stirrer is set into rotation. The water jets leaving the nozzles 12 are caught by the surrounding mantle plate 4 from which the water is flowing down on to the outer walls of the can for cooling it. Thus all the cooling water is utilized firstly for cooling the inner portions of the milk in the can through the depending stirrer, secondly for driving the said stirrer when flowing out through the reaction turbine nozzles thereon, and thirdly for cooling the outer portions of the milk in the can by flooding the outer walls thereof.

The bore in the journal sleeve 6 is provided with cylindrical journal surfaces 21 and 22 for the extension sleeve 7a above and below the enlargement 17, and the sleeve 6 may be provided in its wall above the journal surface 21 with an outlet hole 23 for any water that leaks between the journal surface 21 and the extension sleeve, in order that such water may not reach the ball bearing 15.

What I claim and desire to secure by Letters Patent is:—

1. An apparatus for cooling and aerating milk in standard milk cans, comprising a holder adapted to be applied on the top of the can and consisting of a ring lying within the edge of the mouth of the milk can, a surrounding annular guard plate, bent strips connecting said guard plate to said ring, crossed bars carried at the upper end of said guard plate, and a centrally arranged journal sleeve carried by said crossed bars, a rotary stirrer adapted to hang down freely within the milk in the can and consisting of a central tube journaled at its upper end in said journal sleeve on the holder and provided with a cooling water inlet, a pair of outer tubes disposed on opposite sides of the central tube and connected to the latter at the lower ends of the tubes, a cover plate lying above the mouth of the can and penetrated by the said tubes, and outwardly projecting extensions provided on the said outer tubes at the upper ends thereof above the said cover plate and having tangentially disposed outlet ends forming reaction turbine nozzles.

2. An apparatus for cooling and aerating milk in standard milk cans, comprising a holder adapted to be applied on the top of the milk can and having a centrally disposed journal sleeve, and a rotary stirrer adapted to hang down freely within the milk in the can and consisting of a central tube and a plurality of laterally disposed tubes connected at their lower ends to the lower end of the central tube and having at their upper ends outwardly projecting extensions having tangentially disposed outlet ends forming reaction turbine nozzles, an extension sleeve detachably secured to the upper end of the said central tube and journaled in the centrally disposed journal sleeve on the holder, the said journal sleeve having a bore providing two journal surfaces for the said extension sleeve and between said journal surfaces an enlargement having an inlet for cooling water, said extension sleeve being provided with inlet holes in its wall for the cooling water at the said enlargement.

3. An apparatus for cooling and aerating milk in standard milk cans as stated in claim 3, in which the said extension sleeve is closed at its upper end and provided with a projecting stud journaled at the upper end of the journal sleeve by means of a thrust ball bearing, a leak water outlet hole being provided in the wall of the journal sleeve above the upper cylindrical journal surface for the extension sleeve.

LINUS JOHAN REINHOLD HASSELBERG.